(No Model.) 3 Sheets—Sheet 1.
E. T. TAYLOR.
CASH REGISTER AND INDICATOR.
No. 566,878. Patented Sept. 1, 1896.
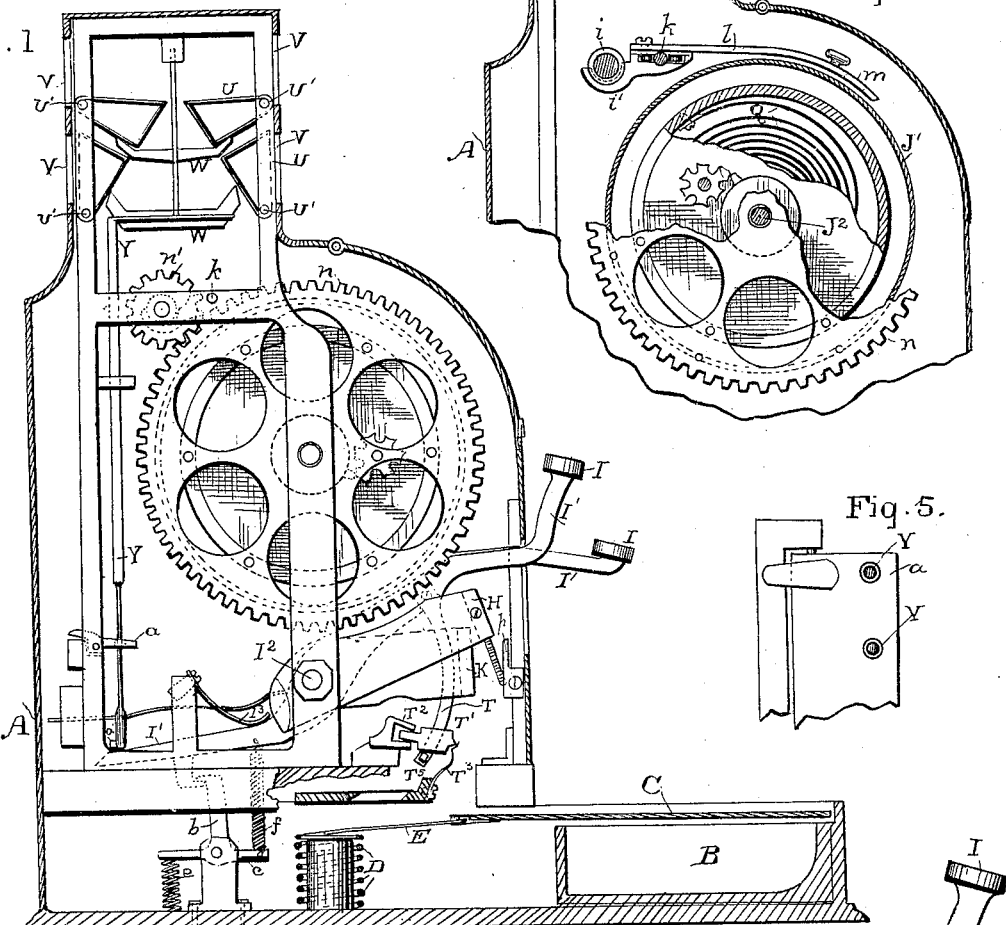
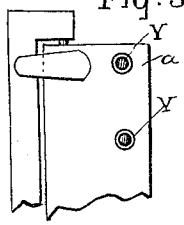
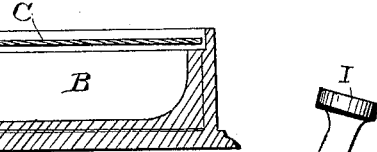
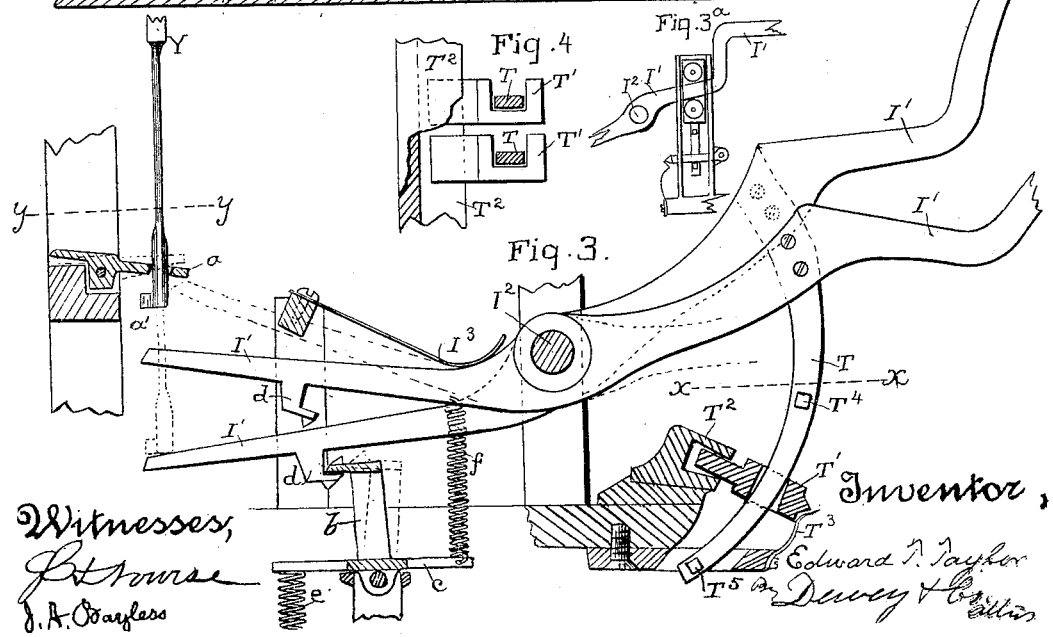
Witnesses:
Inventor,
Edward T. Taylor
by Dewey & Collins (No Model.) 3 Sheets—Sheet 2.
E. T. TAYLOR.
CASH REGISTER AND INDICATOR.
No. 566,878. Patented Sept. 1, 1896.
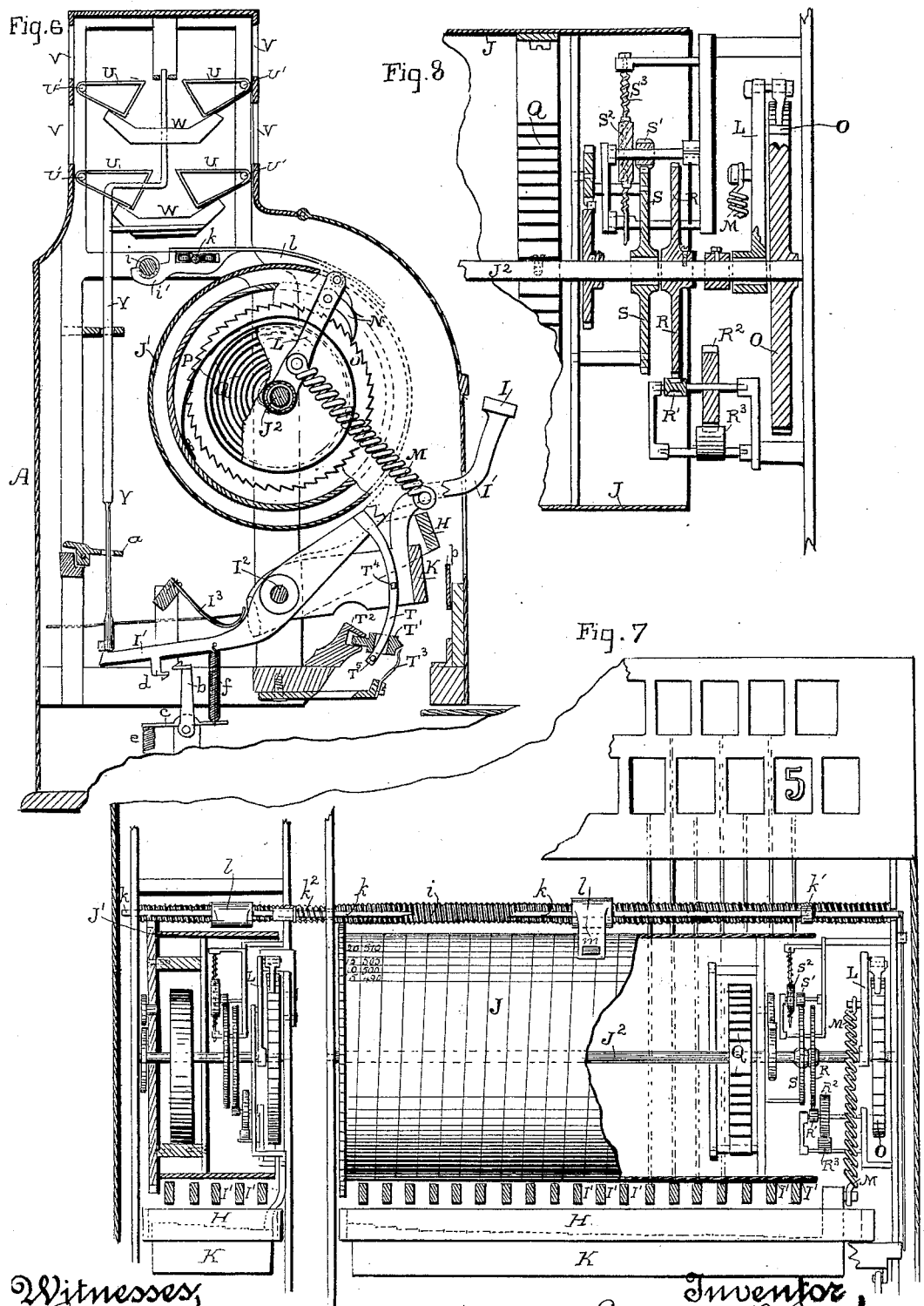
Witnesses,
Inventor
Edward T. Taylor
By Dewey & Co,
Atty.

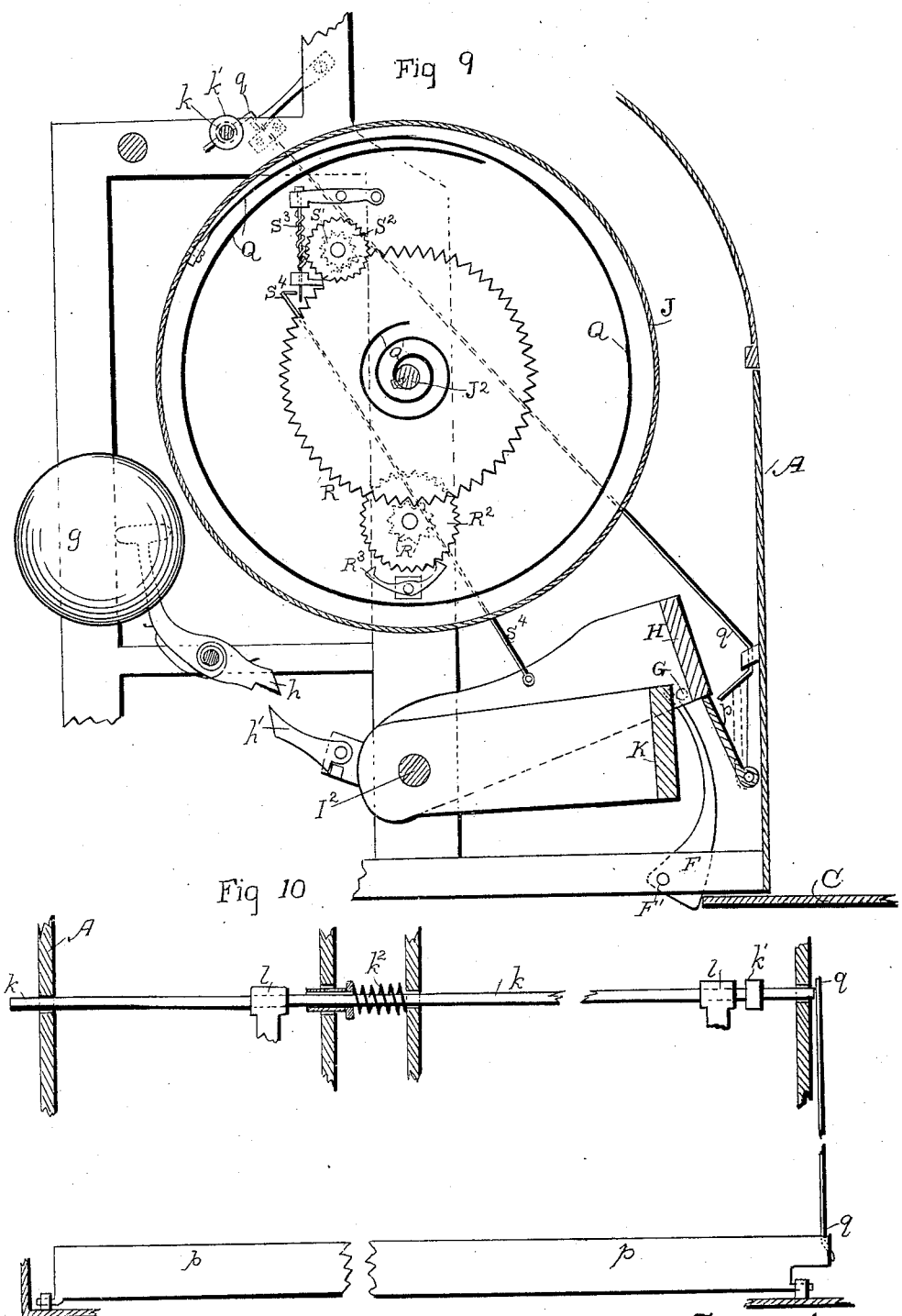

UNITED STATES PATENT OFFICE.

EDWARD T. TAYLOR, OF OAKLAND, CALIFORNIA.

CASH REGISTER AND INDICATOR.

SPECIFICATION forming part of Letters Patent No. 566,878, dated September 1, 1896.

Application filed September 9, 1895. Serial No. 561,999. (No model.)

*To all whom it may concern:*

Be it known that I, EDWARD T. TAYLOR, a citizen of the United States, residing in Oakland, county of Alameda, State of California, have invented an Improvement in Cash Registers and Indicators; and I hereby declare the following to be a full, clear, and exact description of the same.

My invention relates to an apparatus by which the amount of cash received is registered and indicated and by which the consecutive amounts are added up, so that the total may be observed at any time.

It consists in details of construction which will be more fully explained by reference to the accompanying drawings, in which—

Figure 1 is a vertical section of the outer case and end view of the frame and mechanism. Fig. 2 is a part section of the cylinder and case. Fig. 3 is an enlarged detail of the keys and mechanism. Fig. 3ª is a modified form of the same. Fig. 4 is a horizontal section on $x\ x$ of Fig. 3. Fig. 5 is a horizontal section on $y\ y$ of Fig. 3. Fig. 6 is a vertical end section of the apparatus. Fig. 7 is a vertical longitudinal section. Fig. 8 is an enlarged sectional detail of the driving mechanism. Fig. 9 is a cross-section showing the drum controlling and locking device. Fig. 10 is a longitudinal section of the same.

A is the casing within which the mechanism is contained, this casing being of any suitable or desired shape, material, and construction.

In the lower front portion is a stationary cash-receptacle B, which projects in front of the main casing and is provided with a cover C, slidable in suitable guides, so as to be moved forward to cover and close the cash-receptacle or to be retracted for the purpose of exposing it.

D is a spiral or coiled spring standing vertically in the lower portion of the case and having an arm E extending from the upper portion and connecting with the rear of the sliding cover C, preferably passing through an opening which is provided with an anti-friction-roller, against which the arm bears.

When the cover C is drawn forward to close the cash-receptacle, it is retained in this position by one angle of a curved lever-arm F, the other angle of which is fulcrumed to a stationary part of the case or frame, as shown at F'. The curved upper end of this arm is adapted to be engaged by a pin G upon the oscillating bar H, which extends along the front of the machine and is depressible by the action of the keys I when either of the latter are depressed. When the bar H is thus depressed, it acts upon the lever-arm F to tilt it about its fulcrum-point, thus moving the angle which engages the cover C until the latter is released, when it is immediately drawn back by the action of the spring D and arm E, previously described.

After the cash has been deposited or the operation properly completed the cover is drawn forward and again latched by the lever-arm, which is actuated by a suitable spring so as to fall into place behind the cover when the latter has been moved forward to close the receptacle.

In the apparatus here described I employ two registering-cylinders J and J'. One of these cylinders has marked spirally around its periphery figures indicating cents with any desired interval between the amounts, as "5," "10," "15," &c., up to "95" cents. The other cylinder is, in like manner, divided to indicate dollars, with similar intervals between, and may indicate from "1" to "10" or "20" dollars, or other amount. These cylinders are mounted to rotate upon a shaft or shafts $J^2$, suitably journaled in supporting-standards, and either of the cylinders may be turned upon them independently of the other by the operating mechanism.

The buttons or keys I, extending along the front of the machine, have marked upon them figures representing the subdivisions which are indicated upon the cylinders, those connected with the first cylinder representing cents from "5" to "95" and those connected with the second cylinder representing dollars. These keys are fixed upon the ends of levers I', and the levers are fulcrumed upon a shaft $I^2$, which extends horizontally through the lower part of the case beneath the two cylinders. The front ends of the levers which project outside of the inclosing case are normally held up by weights or springs. In the present case I have shown them acted upon by springs I³, which are fixed so as to press suitably upon the levers and return them to their position whenever they have been depressed.

K is a bar extending along within the front of the case and beneath the key-levers. This bar is inclined or formed with steps from one end to the other beneath the keys, and it and the bar H are both fulcrumed by inwardly-extending arms upon the shaft I², upon which the key-levers I' are fulcrumed. This bar K is connected with the actuating mechanism which rotates the drums, and the point upon the bar which is struck by the key when the latter is depressed controls the amount of movement and the consequent advance of the drum. Thus when the key-lever indicating the smallest amount is depressed it strikes the lowest part or step upon the bar K, and the completion of the movement of the key-lever will only be sufficient to advance the indicating-drum one figure and thus indicate the smallest amount. Any amount above this is correspondingly indicated by its key striking the bar higher up and thus moving it over a greater distance during the remaining stroke of the key.

The mechanism by which the drums are advanced consists of a lever L, fulcrumed and turnable about the shaft upon which the drums are mounted. This lever is connected with the bar K by a rod or link M. I have shown this link in the present case in the form of a stout spiral spring of sufficient rigidity to practically act under ordinary conditions as a solid bar, but in case of any sudden blow upon either of the keys, which would tend to break or disarrange the mechanism if a straight link was used, this spiral link would yield sufficiently to relieve the parts of sudden strain.

The lever L carries a pawl N, which engages with the teeth of a ratchet-wheel O, mounted and turnable with the drum-shaft.

The drums J and J' have springs Q coiled within them, one end of the spring being attached to the interior of the drum and the other end to the shaft upon which the ratchet-wheel is fixed.

Whenever the ratchet-wheel is turned, it acts to coil this spring so as to give it a little more tension, and the power of this spring thus coiled acts, when released, to rotate the indicating-drum, as will be hereinafter described. Mounted upon the same shaft and movable simultaneously with this ratchet-wheel is a gear-wheel R, the lower side of which engages a pinion R', so as to rotate it and its journal-shaft with every rotation of the ratchet-wheel. Upon the same shaft with this pinion is mounted an escapement-wheel R², and this engages with an escapement R³, so that when the pinion and escapement-wheel are rotated by the movement of the ratchet-wheel the escapement oscillates rapidly, and while allowing the escapement-wheel to rotate as long as pressure is brought upon the key it will not allow the movement to continue after the key stops, and in this manner it prevents any movement of the parts by momentum which might be acquired by forcing the key down with great rapidity, thus preventing what is technically called an "overthrow."

It will be understood that when the escapement-wheel R² is rotated by the turning of the gear-wheel R, Fig. 9, the escapement R³ will be oscillated upon its fulcrum, each of the pawls at its opposite ends being alternately engaged with and disengaged from a tooth of the wheel R², and when one pawl disengages by reason of the oscillation the other engages with a tooth upon its side, so that the escapement-wheel advances a tooth at each oscillation of the escapement-pawl, and when one pawl releases a tooth the other instantly engages the next one, and thus prevents any further movement of the escapement-pinion and the connected gearing. Pressure upon the key acts through its connections and the gearing to thus oscillate the escapement-lever as long as the pressure continues, but at the instant it ceases one of the pawls of the escapement-lever will engage a tooth of the escapement-wheel and thus stop any further movement by acquired momentum (or "overthrow," as it is termed.)

Upon the shaft which carries the drum containing the coil-spring Q is another gear-wheel S, which turns loosely. This gear-wheel engages at the upper side with a pinion S', the shaft of which is journaled in suitable bearings and has fixed upon it a worm gear-wheel S². The teeth of this worm-gear engage with the worm or screw S³, the stem or shank of which is journaled in vertical bearings and turns loosely therein.

S⁴ is a light rod or wire, the lower end of which is attached to one of the arms of the bar H, so that when the bar H is depressed it will draw upon this rod or wire. The upper end of the rod is adapted to make contact with the shaft of the worm S³ whenever the bar H is depressed, and thus prevent the worm from turning. By this construction the gear-wheel S is locked and the depression of a key acts only to rotate the ratchet-wheel O and through it to partially coil the spring Q and increase its tension.

As before stated, the escapement R³ prevents any overthrow of movement of the ratchet on the downstroke of the key, while the worm-gear and its locking-rod S⁴, just described, will prevent any movement of the gear S until the worm-gear has been released. This release takes place as soon as the key is released and the bar H allowed to rise.

As the rising of the bar H moves the rod or wire S⁴ backward and out of contact with the shaft of the worm-screw S³ it allows the latter to be rotated by the pressure of its wheel acted upon through the pinion S' and the gear S. This release allows the indicating-drum to be moved forward after the key has risen to its normal position, and the coil-spring Q will have sufficient tension to move it forward the number of figures corresponding with the key which has been depressed. The mechanism just described prevents any overthrow of the drum.

Each key-lever I' has fixed to it an arm T, these arms either having a curvature with a radius essentially from the fulcrum-shaft I², about which the key-levers turn, or they may be straight and travel in guides, as shown in Fig. 3ᵃ, the lever-arm sliding loosely through them. Each of these arms T passes through a hole or channel in a plate T', the inner end of which is loosely fitted into a socket in a support T², which allows it perfect freedom of motion up and down and also to right and left.

The outer end of each of the plates T' is pointed, as shown, and a spring T³ presses against the end of the plate, so that when the key-lever I' is being depressed the arm T will move downward freely through the hole in the plate T', but if the key is released the lever cannot rise, because this plate T', turning in its socket, will bind against the arm T, clamping it upon two opposite sides, so as to prevent its rising, and the key-lever may be pushed down any short distance and will remain in that position unless it is pushed entirely to the bottom of the stroke to complete the operations which are controlled by it. When it has been pushed entirely to the bottom, a pin T⁴, which is fixed to the arm T, comes in contact with the plate T' and pushes it downward until the point at the outer end has passed below the end of the spring T³, and this spring then holds it in that position where the hole through T' is in line with the arm T, and will not then bind against it. This allows the arm to move freely through the hole and the key to rise to its normal position. When the key has just reached its normal position, another pin T⁵, fixed in the lower end of the arm T, will strike the bottom of the plate T', and will raise it up so that the spring T³ again falls into its position against the lower end of T', and it is thus held ready to again lock the arm T when the key is again depressed.

The indicating device consists of a series of tablets or plates U, which are hinged and turnable about fulcrum-rods U'. These fulcrum-rods are situated at the bottom of openings V made in the extension or upper part of the casing, so that when the indicating-plates are turned up about their fulcrum-rods they will be presented in these openings, so that they can be easily inspected.

When the plates turn or drop backward about their fulcrum-rods, they lie in an essentially horizontal position and are then not in view through the openings. These indicating-plates are usually arranged in pairs, one plate of each pair facing the front and the other the rear of the machine, so that persons upon opposite sides can see the indicator. In the present case I have shown these indicators movable about their fulcrum-rods by means of arms W, which are fixed upon the upper ends of vertical rods Y. The lower ends of these rods rest upon the rear ends of the key-levers I', and when any key is operated the rear end of the lever, rising, will push up the indicating-rod Y, which rests upon it, and will thus move the indicating-disk into position to be inspected.

In order to hold the indicating-rod up after it has once been raised, I have shown a pivoted oscillating plate $a$, having holes or channels made through it, through which the rods Y pass, and the holes in this plate are of such shape that they offer no resistance to the upward movement of the indicating-rods, but as soon as the rods are released by the return of the key-lever to its normal position the plate $a$, turning loosely about its fulcrum-points, will bind against opposite sides of the rod and thus hold it in position until some other key is depressed and its indicating-rod raised. Whenever this second key is thus depressed, a lug $a'$, projecting from the rear end of the rising rod Y, will come in contact with the plate $a$, and when this lug strikes the plate $a$, which is holding the previously-raised indicator-rod, it tilts the plate until the edges of the hole in the plate $a$ cease to bind upon the rod Y and the rod will then easily slide through it and the indicator will be allowed to return to its position of concealment by gravitation, while the indicating-rod raised by the last-mentioned key-lever will in turn be clamped by the clamping-plate and remain in its elevated position until similarly released by the next one operated.

In order to make the operation of this device certain and prevent two or more of the indicators being thrown up by sudden movement and both retained in the elevated position, I have shown the rods Y as being made smaller at a point just above the enlarged lower end, which is held by the binding-plate $a$, and this reduction in the size of the rod insures its falling freely through the hole in the plate as soon as the latter is brought into position to release it.

In order to prevent two or more keys being depressed simultaneously, I have shown a locking mechanism which is constructed as follows: $b$ is an arm projecting upwardly from a rocking plate $c$, said arm having a projection which, when the arm is tilted backward, will engage with a lug or hook $d$ upon the key-lever I', as shown in Figs. 3 and 6. $e$ is a spring so connected with one arm of the rocking bar $c$ as to normally hold it in position, which will hold the arm $b$ in the position shown in dotted lines in Fig. 3 and in full lines in Fig. 6, when the arm will be out of the engagement with the lug $d$ upon the key-lever I'. $f$ is a spring connecting the key-lever I' with the opposite end of the tilting bar $c$. The tension of the spring $f$ is so much less than that of the spring $e$ that any single key-lever may be moved far enough by the depression of its key to be clear of the lug $d$ before it acts to change the position of the tilting bar $c$ and the arm $b$, which is carried by it, but if two keys should be depressed simultaneously the combined tension of the two springs $f$ will be sufficient to overcome that of the spring $e$ and thus allow the bar $c$ to tilt sufficiently to throw the arm $b$ into engagement with the hooks or lugs $d$ of the key-levers and thus prevent any further motion of these levers.

The gong or bell $g$ is struck by a hammer, the arm or handle of which is properly fulcrumed, and has the end $h$ so formed as to be engaged by the pawl $h'$, which projects from the rear of one of the arms of the bar H, so that when this bar is depressed by the action of any key-lever it throws the pawl-arm $h'$ up so that it engages the end $h$ of the hammer-handle and retracts it from releasing it so that by means of its spring it is returned to strike the bell. The pawl-arm $h'$ is so hung as to turn loosely and pass the hammer-arm when the key is released, and the bar H returns to its normal position.

The indicator-drums have a spiral arrangement of figures upon them, and at some point in convenient relation with each of the drums is journaled a screw $i$, Fig. 2, which is engaged by a half-nut $i'$, so that as the screw is revolved this nut is caused to travel along the shaft $k$, upon which it is loosely journaled. From the arm of this nut $i'$ projects an arm $l$, carrying upon the front end a perforated or slotted plate, as shown at $m$, through which the figures just beneath are exposed, so that each advance of the drum acts through a gear-wheel $n$ and pinion $n'$, Fig. 1, to rotate the screw-shaft $i$ and thus advance the index-hand or disk $m$ at the same rate that the spirals upon the indicator-drum are advanced. When by continued operation the indicator-arm has approached the end of its path, it will be necessary to return it again to the beginning, and it is also necessary to prevent any further operation of the keys until it has been thus returned. In order to thus lock the keys and notify the operator that the indicator has reached the termination of its journey, I employ a tilting plate $p$. (Shown in Figs. 9 and 10.) This plate extends beneath the bar H, being hinged at the bottom and normally tilted so as not to offer any obstruction to the movement of the bar H. It is held in this position by the bent end of a wire $q$, which impinges against it. This wire extends upward and backward to a point in line with the shaft $k$, upon which the indicator-bars and nuts are slidable. Upon this bar $k$ is fixed a collar $k'$ at such a point that when the indicator-bar has reached the end of its journey it strikes this collar and moves it and the shaft $k$ endwise. This shaft $k$, moving in this manner, acts against the upper end of the rod or wire $q$, which is bent, as shown in Fig. 9, and turning it about its axis moves the lower end so as to release the tilting plate $p$ and allows it to fall beneath the bar H, which is thus prevented from any further depression until the indicator-plate has been moved back to the starting-point.

The shaft $k$ is normally held in its proper position by a spring $k^2$, the tension of which is easily overcome by the action of the indicator-bar $l$ when the latter strikes the collar $k'$.

Having thus described my invention, what I claim as new, and desire to secure by Letters Patent, is—

1. The combination with controllers of keys, each key having portions adapted to bear lightly upon opposite parts of its controller when said key is moved in one direction, and to cramp said portion and prevent its movement in the other direction until said first-named movement is completed.

2. A cash-register consisting of one or more drums having figures imprinted spirally thereon, indicator-plates adapted to be advanced transversely to the rotary movement of the drums so as to follow the lines of figures, means for rotating the drums and advancing the indicators, consisting of mechanism intermediate between the drums and depressible keys, a locking-plate whereby the depression of the keys is prevented when the indicator-plate has reached the termination of its travel, and mechanism actuated by said indicator-plate whereby the locking plate or bar is thrown into engagement to prevent further operation of the keys.

3. In a cash-register, key-levers, a bar operated thereby the spirally-imprinted drums, mechanism by which said drums are rotated, an indicator plate or plates adapted to be advanced transversely to the rotary movement of the drums so as to follow the lines of figures, a fulcrum-shaft upon which the indicator-plate is loosely mounted and movable from end to end, a spring by which said shaft is normally pressed in one direction, a collar upon the shaft against which the indicator-plate makes contact when it has reached the end of its travel, a rod, one end of which is in line and in contact with the end of the fulcrum-shaft, and the other end in contact with a tilting plate which it normally holds out of the line of motion of the bar which is operated by the key-levers, said rod being moved by the end motion of the fulcrum-shaft so as to disengage the locking-plate and allow the latter to lock the key-operated bar so as to prevent a further operation of the keys.

4. In a cash-register, key-levers movable about a fulcrum-point, arms connected and movable with said levers, slotted binding-plates through which the arms pass, said plates being loosely supported and yielding to allow the arms to be moved downward, and movable so as to lock the arms and prevent the keys from rising.

5. In a cash-register, key-levers movable about a fulcrum-point, arms connected and movable with said levers, loosely-suspended slotted plates through which said arms pass, springs with which the outer ends of said plates engage whereby they are held in position to bind against and prevent the key-levers from rising, if released, at any intermediate point in the depression of the keys, pins projecting from the arms adapted to form contact with the binding-plates when the keys reach their lowest point, whereby the plates are moved with relation to the holding-springs, and the slots or channels brought into line with the arms so as to allow the latter to move freely through them and the keys to rise.

6. In a cash-register, key-levers movable about fulcrum-points having arms connected and movable with them loosely-supported slotted plates, through which the arms pass, springs by which the said plates are held in position to clamp the arms and prevent their moving up from any intermediate point during the downward movement of the keys, pins projecting from said arms to engage the clamping-plates from above and move them with relation to their holding-springs so as to bring the slots into line with the arms and allow the latter to slide freely through the slots so that the keys may return to their normal position, other pins fixed to the arms and adapted to engage the plates from below when the keys have reached their normal position whereby the plates are again tilted with relation to their holding-springs so as to be in position to bind the arms when the keys are again depressed.

7. In a cash-register, key-levers depressible about their fulcrum-points, mechanism to prevent the depression of more than one lever at a time, consisting of a tilting bar and upwardly-extending arms carried thereby and provided with lugs adapted to engage lugs upon the key-levers, springs acting on the tilting bar at one side of its fulcrum whereby these said arms are normally held out of contact with the key-levers, and other springs connected with the bar on the opposite side of its fulcrum and with the levers having a tension such that the depression of two levers will overcome the tension of the first-named springs, and allow the tilting bars to engage with and lock the key-levers so as to prevent their being depressed.

8. In a cash-register, fulcrumed key-levers, indicator-plates by which the amount of the transaction is visibly signaled, vertically-movable rods actuated by the key-levers so as to expose the indicator-plates, and a tilting plate having openings through it of sufficient size to allow the rods to freely pass in one direction, said plate then tilting about its axis so that the edges of the walls of the openings through which the rods pass will bind against the opposite sides of the rods and retain said rod in an elevated position after the key-lever has returned to its normal position.

9. In a cash-register, vertically-moving, indicator-actuating rods, key-levers adapted to engage said rods when the keys are depressed, a plate having openings through it of a sufficient size to allow the rods to freely pass in one direction, said plate being pivotally mounted so that the opposite edges of the walls of its openings may bind against the opposite sides of the elevated rod to maintain said rod elevated after the key-lever has returned to its normal position, and lugs upon the rods adapted to be raised into contact with the tilting plate, by the rear ends of the key-levers, to rock said plate about its axis and release the edges of the walls of its openings from their contact with the sides of the elevated rod, when any other key-lever is operated and its indicator-rod elevated.

10. In a cash-register, spirally-imprinted drums, with indicator-plates movable at right angles, with the direction of rotation of the drums, key-levers fulcrumed and depressible about their fulcrum-points, mechanism intermediate between the key-levers and the drums, consisting of ratchet-wheels, a pawl-carrying arm connected so as to be actuated by the depression of any key-lever whereby the ratchet-wheel is rotated in proportion to the movement of the key-lever, a spring coiled within the drum having one end connected therewith and the other with the shaft of the ratchet-wheel, whereby the movement of the ratchet-wheel partially winds the spring, a gear-wheel fixed to the drum-shaft and movable therewith, a pinion with which the gear engages, a worm-gear fixed upon the pinion-shaft, a device whereby the worm is locked to prevent the rotation of said gear when a key is depressed, said device releasing the worm so as to allow the gear and pinion to rotate, and the drum to advance after the key has returned to its normal position.

11. In a cash-register, spirally-imprinted drums and indicators movable at right angles with the direction of rotation of the drums so as to follow the lines of figures thereon, depressible keys and key-levers, a bar extending beneath said levers so as to be depressed by the movement of either key-lever, a ratchet-wheel, a pawl engaging said ratchet-wheel attached to a lever movable about the ratchet-wheel shaft, and a link connecting the ratchet-lever with the key-actuated bar whereby the depression of any key moves the ratchet-lever and the ratchet-wheel, a spring coiled within the drum having one end secured thereto and the other to the ratchet-wheel shaft whereby the spring is partially coiled by each advance of the ratchet, while the drum remains stationary, a gear-wheel connected with the drum-shaft and engaging with a pinion upon the shaft of a worm gear-wheel, a device whereby the worm is locked and prevented from rotating during the depression of a key-lever and released so as to allow the connected parts and the imprinted drum to advance after the key-lever has risen to its normal position.

12. In a cash-register, the spirally-imprinted drum with indicating-plate adapted to be advanced transversely to the rotary movement of the drum, a spring coiled within the drum having one end connected therewith and the other with a ratchet-wheel shaft, a pawl-lever and pawl engaging the ratchet-wheel and connected with the key-actuated bar whereby the depression of any key moves the ratchet-wheel and coils the spring within the drum, a locking mechanism whereby the drum is prevented from rotating during the advance of the ratchet-wheel and is released so as to be rotated by the spring after the key has returned to its normal position, a gear-wheel mounted upon the ratchet-wheel shaft so as to be rotated by the movement of the pawl-lever, a pinion with which said gear engages, an escapement-wheel fixed upon the pinion-shaft, and an escapement engaging said wheel and oscillating during the movement of the pawl-lever so as to limit the rotative movement of the ratchet-wheel upon the downward stroke of a key-lever.

13. The combination with the reciprocating key-levers of a cash-register, of arms carried thereby, and loosely-pivoted clamping-plates through which the arms move freely in one direction, said plates acting to bind against the sides of the arms, and prevent the keys from returning in the opposite direction.

14. The combination with the reciprocating key-levers, of a cash-register, of arms carried thereby, loosely-pivoted clamping-plates through which the arms move freely in one direction, and which bind against the sides of the arms to prevent their moving in the opposite direction, and mechanism actuated by the key-levers at the end of their stroke whereby the clamping-plates are shifted to allow the levers to return to their normal position.

15. The combination with the reciprocating key-levers and movable indicator-tablets of a cash-register, of a hinged tilting binding-plate having openings through which the tablet-actuating rods move freely in one direction, and whose edges bind against opposite sides of the rods to prevent their falling when the key-lever descends, each rod having a lug which serves to disengage the plate and allow a previously-engaged rod to fall.

In witness whereof I have hereunto set my hand.

EDWARD T. TAYLOR.

Witnesses:
S. H. NOURSE,
JESSIE C. BRODIE.